United States Patent [19]

Rasmussen et al.

[11] Patent Number: 5,419,498
[45] Date of Patent: May 30, 1995

[54] MATERIAL HANDLING SYSTEM AND METHOD

[75] Inventors: Dale D. Rasmussen; Lee D. Hoffmann, both of Green Bay, Wis.

[73] Assignee: FEECO International, Inc., Green Bay, Wis.

[21] Appl. No.: 50,534

[22] Filed: Apr. 19, 1993

[51] Int. Cl.⁶ .................. B02C 18/06; B02C 23/02
[52] U.S. Cl. .................................. 241/30; 241/280; 241/605
[58] Field of Search .............. 241/30, 34, 223, 280, 241/605

[56] References Cited

U.S. PATENT DOCUMENTS

| | | | |
|---|---|---|---|
| 1,777,670 | 10/1930 | Hausman | 241/34 X |
| 2,549,876 | 4/1951 | Williamson | 241/605 X |
| 2,644,501 | 7/1953 | Perry | 241/280 |
| 2,889,862 | 6/1959 | Williamson | 241/280 X |
| 2,929,756 | 3/1960 | Schuh | 241/280 |
| 3,208,491 | 9/1965 | Bliss | 241/280 X |
| 3,401,891 | 9/1968 | Fleeman et al. | 241/34 |
| 4,084,753 | 4/1978 | Fruh | 241/34 |
| 4,497,085 | 2/1985 | Van Doorn et al. | 241/280 X |
| 5,209,413 | 5/1993 | Dwyer et al. | 241/280 X |
| 5,222,675 | 6/1993 | Stover | 241/605 X |

FOREIGN PATENT DOCUMENTS 528821 8/1956 Canada ...................... 241/605

Primary Examiner—Timothy V. Eley
Attorney, Agent, or Firm—Thomas D. Wilhelm

[57] ABSTRACT

A material feeding system and method generates a specified continuous output from a variable quantity of discrete and separated units of input. The conversion from discrete units of input to a continuous stream of output is facilitated by a dispersing wheel positioned over the conveying apparatus, in a position blocking the advance of the discrete units of input. The dispersing wheel rotates in opposition to the direction of advance of the conveying apparatus, breaking up the units of input and dispersing them along the length of the advancing conveying apparatus. The dispersing wheel has an outer cylindrical surface, with teeth thereon, which teeth engage the material and, in combination with the advance of the conveying apparatus, disperse the material on the conveying apparatus.

22 Claims, 7 Drawing Sheets

MATERIAL HANDLING SYSTEM AND METHOD

FIELD OF THE INVENTION

This application relates generally to equipment and methods for feeding bales of material to a processing unit where the bales are broken down and dispersed, converting them to a continuous feed stream of raw material. Typical bales are made by assembling waste paper, compressing the assembled paper to increase its volume density and make a bale, and holding the bale together as a unit by tying cord, wire, or the like around the so-formed bale. The bales are then shipped to a re-pulping or other processing unit, where the waste paper is processed into pulp or other product which can be used again.

BACKGROUND OF THE INVENTION

The shipment of low density material is generally costly if the low density nature of the material is retained during shipping and/or storage operations, referred to hereinafter as "subject events." Thus, where feasible, low density materials are compressed to raise the density, inter alia to reduce the volume, for these subject events which do not depend on the density for successful completion.

In some cases, the low density is desirably recovered when the subject event is completed. In other cases, the density is not particularly important after the subject event. This practice of changing the density for the subject event is cost effective so long as the cost of the subject event is reduced enough to offset the cost of increasing the density before, and potentially recovering the low density after, the subject event.

As a way of illustrating the processing of baled material, this application focuses on use of the invention to operate on bales of waste paper in recycling paper to make pulp.

As used herein, the bales of waste paper typically comprise ordinary sheets of 8½ by 11 inch office paper, and the like, along with other light weight papers up to about 70 pounds per 3000 square foot ream. While any given system can process a variety of paper waste, the products and processes used in the pulping operation, and the products made therefrom generally suggest a primary sort before baling, whereby a given bale is limited to particular classes, or types of paper. For example, a first category of paper which can be baled together is office paper, which is generally light weight, predominantly white, and uncoated. A second category might be unbleached, single layer paper. A third category might be multiple layer corrugated paper. Other categories can be selected as desired.

In processing waste paper, the paper is generally baled at or close to the point of assembly in order to minimize the cost of shipping it to the pulping plant. At the pulping plant, the paper is stored as bales to take advantage of its density in minimizing the cost of storage until the bale is to be used. However, when the bale is to be fed into the pulping unit, it is important that the bale be broken open and dispersed as smaller size elements, and that it be fed into the pulping unit in a relatively lower density, continuous feed stream.

This invention focuses on the process of receiving bales of paper intermittently, transforming the bale into a relatively lower density, continuous feed stream, and delivering the continuous feed stream to the pulping unit.

When a bale is to be used, the cord, wire, etc., holding the bale together is removed, thus breaking the bale open. The bale elements which result from breaking the bale open are then placed on a conveyor, in a bale feeding system, which feeds the paper, as raw material, into the pulping unit.

In feeding raw material into a continuous-feed pulping unit, it is important to control the amount of feed, and the rate of feed. Thus, the paper going into the pulping unit should have a relatively constant density, and it should be fed at a relatively constant rate. A desirable feed system thus corresponds to a constant stream of paper being fed into the pulping unit at a constant depth and density on a feed conveyor.

When the bales of waste paper are broken open, the bale may fragment into components which are smaller than the bale but larger than the original pieces of paper. These components are referred to herein as bale "elements." It is, however, contemplated that the broken bale may retain its general shape, with entanglement of the individual pieces of paper holding it more-or-less together.

In either case, it is usually necessary to further break the bale down into smaller elements and to arrange the paper on the feed conveyor in a generally uniform layer.

It is an object of this invention to provide a feed system for feeding bales of paper into a pulping or other processing unit.

It is a further object to provide, in the feed system, apparatus for receiving an intermittent feed of individual bales of paper, breaking each bale into elements and dispersing it on the corresponding conveyor, and thus providing a relatively constant feed stream of paper going into the pulping unit.

It is yet another object to provide conveying apparatus, and a dispersing wheel over the conveying apparatus, which breaks the bale into smaller elements and creates a relatively constant feed stream for feeding into the pulping unit.

Another object is to provide methods of feeding bales of paper into a processing unit.

Still another object is to provide methods of breaking up and dispersing bales of paper on a conveyor.

SUMMARY OF THE DISCLOSURE.

The invention generally embodies a dispersing wheel for breaking up and dispersing bales of paper. The dispersing wheel has a pair of mounts adapted to mount the dispersing wheel for rotation about an axis of rotation. End plates are secured to corresponding mounts and extend outwardly to edges of the end plates, the edges of the end plates, in combination, lying in an imaginary cylinder extending between the end plates. An outer surface plate extends between, and is secured to, the end plates, the outer surface plate defining a cylindrical outer wheel surface extending between the end plate edges. A plurality of teeth, secured to the outer surface plate, extend outwardly a distance of at least 2 inches from the outer surface plate. The teeth are spaced about the dispersing wheel, on the outer surface plate, preferably at a density of about 10 to about 20 teeth per 1000 square inches of outer surface plate.

In preferred embodiments, the teeth are about ¼ to about ¾ inch thick, are about 3 inches wide at the outer surface plate, extend at least about 2 inches, preferably about 3 inches, from the outer surface plate, and have leading edges, trailing edges, and tops. The leading edges define, in cooperation with at least one of the trailing edges and the tops, corners having angles of no more than about 135 degrees.

The dispersing wheel preferably includes an overload release apparatus. The overload release cooperates with a frame, for mounting the dispersing wheel above a supporting surface (e.g. the floor). The frame includes a pair of lateral support arms which support the dispersing wheel, and extend generally parallel to the end plates of the dispersing wheel. The lateral support arms extend frontwardly and rearwardly of the dispersing wheel, to first and second arm ends. The frame further includes a first upright support at the first end of the lateral support arms and a second upright support at the second end of the lateral support arms. A pivot shaft at the first end of the arms mounts the lateral support arms for pivotation about the first upright support. An upwardly disposed overload slot is located in the second upright support. A mounting pin extends from the second end of the lateral support arms and through the slot, thus mounting the second end of the lateral support arms to the second upright support. Thus, the lateral support arms, through tolerance of upward movement of the mounting pin in the overload slot at the second end, can pivot upwardly, about the pivot shaft at the first end, whereby the dispersing wheel can rise, as needed, to release overload material from under the dispersing wheel.

The invention further comprises a system for feeding bales of paper into a pulping unit, the system comprising a frame; conveyor apparatus having first and second ends, and adapted (i) to receive bales of paper proximate the first end, (ii) to convey the bales through a treatment process, employing the dispersing wheel, which breaks the bales of paper into elements thereof and disperses the paper on the conveyor apparatus, and (iii) to deliver the elements of the bales to the pulping unit proximate the second end of the conveyor apparatus as a generally continuous stream of material, the conveyor apparatus having retaining walls effective to retain the bales, and elements of the bales, on the conveyor apparatus. The dispersing wheel is mounted to the frame, and positioned over and proximate the load transporting member of the conveyor apparatus, with its axis of rotation extending across the conveyor apparatus. The dispersing wheel is disposed in blocking relationship between the retaining walls, to prevent whole bales of paper from passing beyond the dispersing wheel.

In the system, a scale, preferably a nuclear weigh scale, is adapted to determine the actual rate of feeding paper to the pulping unit, and to report the actual rate to a controller. The scale is preferably disposed proximate the second end of the conveyor apparatus. The dispersing wheel is thus positioned in the system between the weigh scale and the first end of the conveyor apparatus.

Conveyor drive apparatus is adapted to drive the load transporting member. The control unit compares the actual rate of feeding paper into the pulping unit, as reported by the scale, to a predetermined rate, and issues commands to the conveyor drive apparatus which adjusts the speed of the load transporting member.

The invention further contemplates a method of dispersing and leveling bales of paper on a conveyor apparatus. The method comprises the steps of mounting the dispersing wheel over, and spaced from but proximate, the load transporting member, the dispersing wheel being in blocking relationship to prevent the bales from traveling under the dispersing wheel without being broken up and dispersed; providing retaining walls at opposing ends of the dispersing wheel and positioned to prevent the bales from traveling around the ends of the dispersing wheel; providing a clear space at least 4 inches wide, preferably at least 6 inches wide, at all locations between the end plates of the dispersing wheel and the retaining walls of the conveyor apparatus; advancing the load transporting member at a first surface speed; rotating the dispersing wheel at a second surface speed at least 2 times, preferably at least 6 times, and in some typical applications, at least 10 times, as fast as the surface speed of the load transporting member, in a direction opposed to the direction of travel of the load transporting member; and feeding bales of paper onto the conveyor apparatus and thus to the dispersing wheel.

As a result of the above steps, the bales of paper are dispersed and leveled on the load transporting member, by the dispersing wheel, with the dispersed elements of paper passing under the dispersing wheel. The dispersing and leveling of the paper by passage under the dispersing wheel is accompanied by controlled leakage of elements of paper around the dispersing wheel and through the clear space between the dispersing wheel and the retaining walls of the conveyor apparatus.

The method preferably comprises, in combination, selecting the diameter of the dispersing wheel, and the spacing of the dispersing wheel from the load transporting member, in view of the dimensions of the bales to be acted upon by the dispersing wheel, such that the bales are confined to a location below the height of the axis of rotation of the dispersing wheel.

Typically, the load transporting member advances at a surface speed of about 6 to about 40 feet per minute, with all speeds in between being contemplated, the speed selected for a particular job depending on the other interdependent engineering parameters.

The overall method of feeding bales of paper into a pulping unit comprises the steps of selecting a desired rate for feeding the paper into the pulping system, preferably expressed in mass or weight units; releasing any mechanical binding holding any given bale together; placing the bales onto the conveyor apparatus; dispersing the bales on the load transporting member, using the dispersing wheel; between the dispersing wheel and the pulping unit, detecting the amount of paper on the load transporting member, and thereby receiving an indication of the rate of feeding of the paper to the pulping unit; comparing the indicated actual rate of feeding to the desired rate; and adjusting the speed of the load transporting member to make the actual rate correspond with the desired rate.

DETAILED DESCRIPTION OF THE ILLUSTRATED EMBODIMENTS

Figure 1:
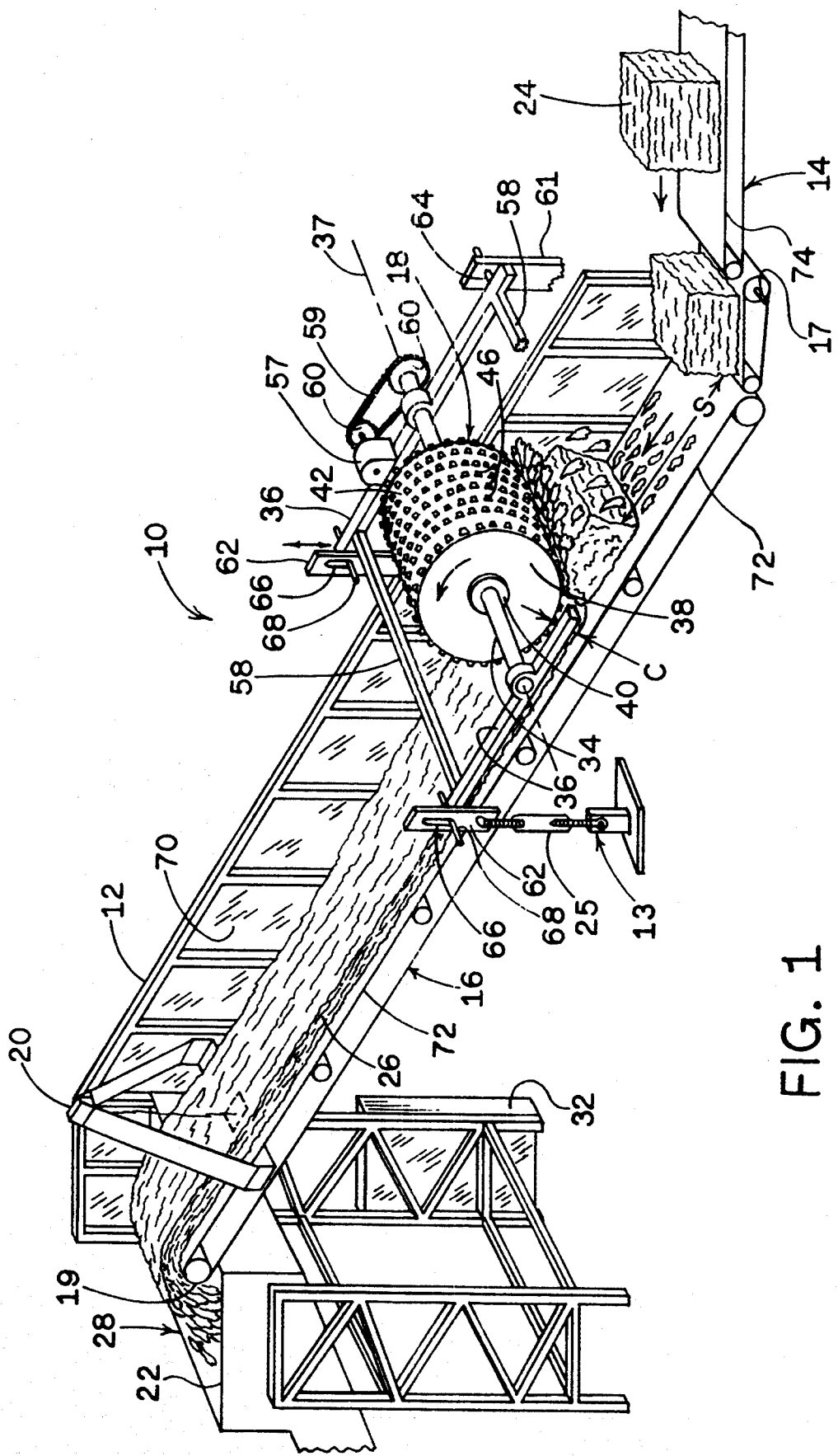
FIG. 1 is a pictorial view, with parts broken away, of a material feeding system of the invention.
Figure 2:
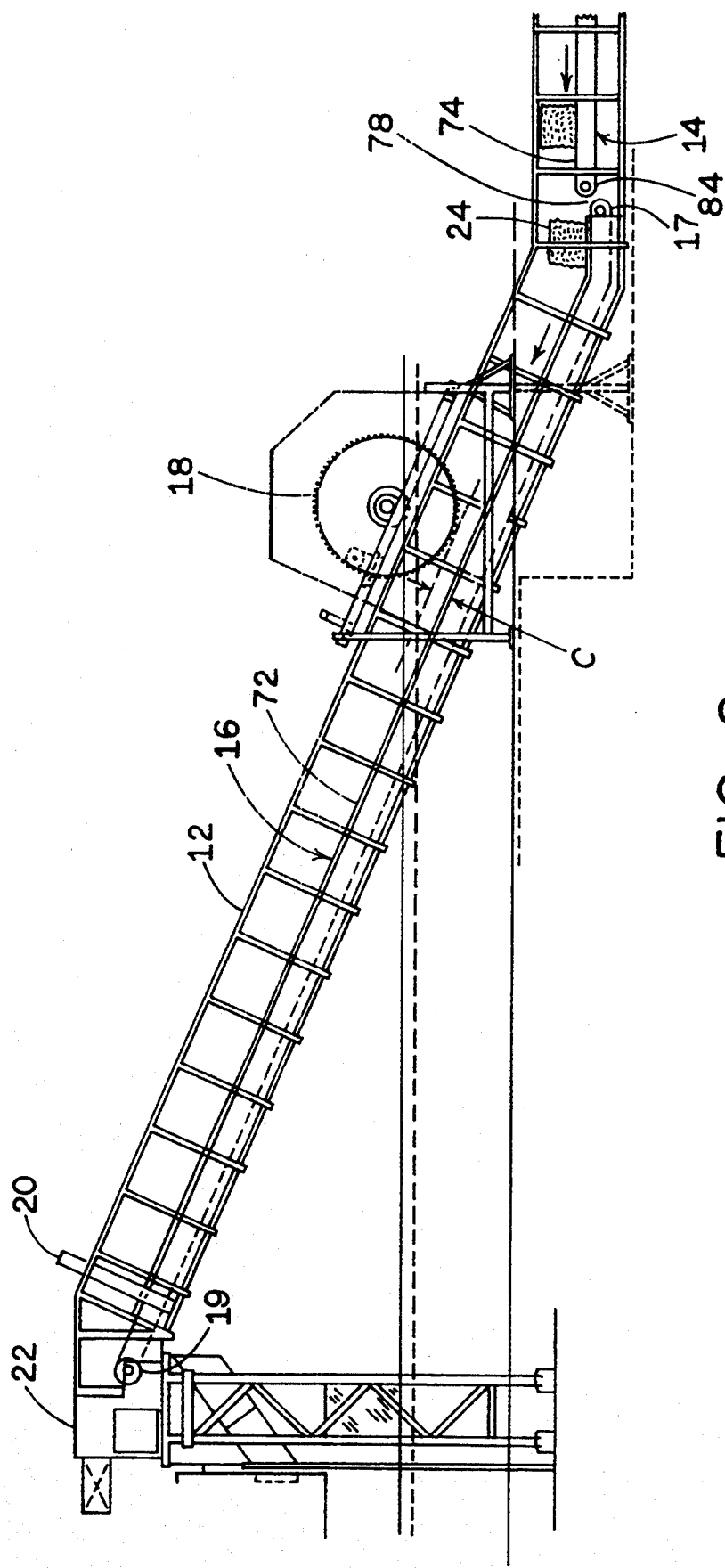
FIG. 2 is a side elevation view of the feeding system of the invention.
Figure 3:
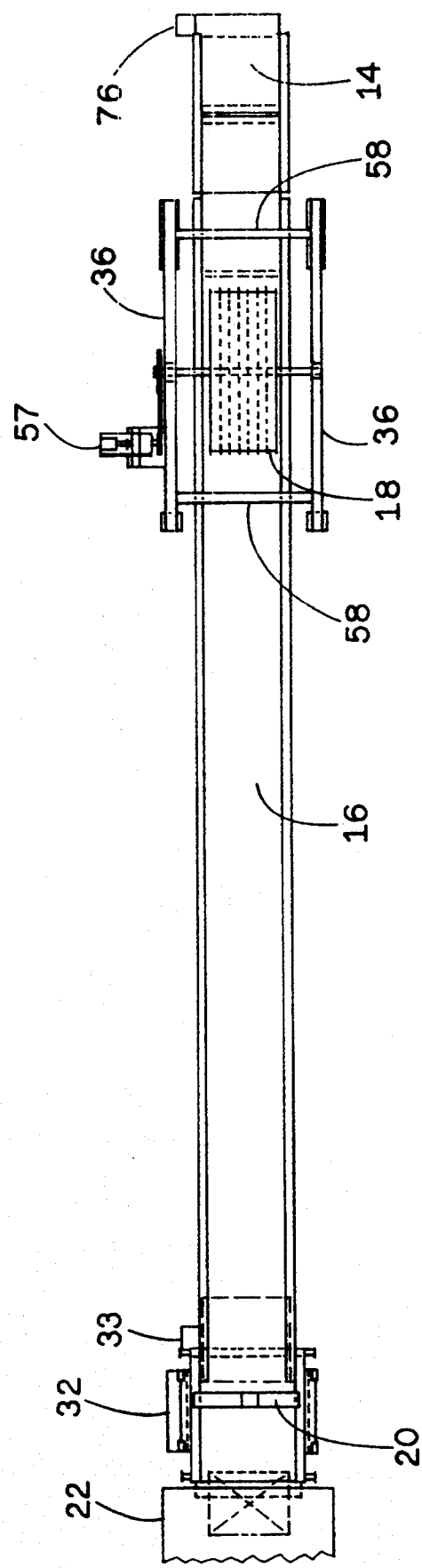
FIG. 3 is a top view of the feeding system of the invention.

FIG. 1 represents a pictorial view of a bale-feeding system 10 of the invention. Referring to FIGS. 1–3, frame 12 supports metering conveyor 14 and feed conveyor 16, a weigh scale 20, and a hopper 22. Frame 13 supports a dispersing wheel 18. The dispersing wheel is mounted over feed conveyor 16, between its receiving end 17 and its discharge end 19, blocking the passage of bales 24 which have not been broken up and dispersed. The clearance between dispersing wheel 18 and conveyor 16 is generally adjusted using turnbuckle 25.

Metering conveyor 14 receives bales 24 of paper from a hopper, not shown, conveys them to the feed conveyor, and transfers them to the feed conveyor. The feed conveyor feeds the bales to the dispersing wheel 18. The dispersing wheel breaks up the bales.

The broken up bale elements are carried, by feed conveyor 16, under dispersing wheel 18 in a layer 26, generally uniform in thickness and continuous in extent, such that the layer 26 can be contemplated as a generally continuous feed stream. Feed conveyor 16 conveys and feeds the generally uniform layer of paper into the hopper 22, which is the receiving element of the pulping unit 28. Shortly before reaching hopper 22, the layer 26 passes through a weigh scale 20 which detects the quantity of paper on conveyor 16, thereby measuring the actual rate of feeding paper to hopper 22, and signals its measurement to controller 32. Controller 32 compares the detected rate of feeding with a predetermined desired rate of feeding, and signals the drive unit 33, driving conveyor 16, whereby the drive speed of conveyor 16 is adjusted to make the actual rate of feeding correspond with the desired rate.

Dispersing wheel 18 is generally configured as a metal cylinder, closed on both ends. Shaft 34 extends through dispersing wheel 18 and mounts the wheel on lateral support arms 36 with the axis of rotation 37 of the wheel extending across the conveyors and between lateral support arms 36. Shaft 34 interfaces with steel end plates 38 through a pair of hubs 40, on opposing ends of the dispersing wheel 18. Outer surface plate 42 is secured to end plates 38 at the outer edges 44 of the end plates (FIG. 7), and defines a generally cylindrical outer surface of dispersing wheel 18.

A plurality of teeth 46 are secured to, and extend outwardly from, outer surface plate 42. Teeth 46 are preferably arranged with uniform spacing. A row-type arrangement is illustrated. The number of teeth typically corresponds to a density of about 10 to about 20 teeth per 1000 square inches of outer surface plate 42.

In the embodiment shown, the dispersing wheel 18 is about 10 feet in outside diameter (outer surface plate 42), and about 50 inches wide (between end plates 38). Both end plates 38 and outer surface plate 42 are made from ⅜ inch steel plate.

The rows 48 of teeth are spaced a distance "RS" of 7 inches apart, and the teeth are spaced a distance "TS" of 10.5 inches apart in the row. This corresponds to a density of 13.6 teeth per 1000 square inches of outer surface plate 42, calculated as follows.

$$7 \text{ in. between rows} \times 10.5 \text{ in. between teeth} = \quad (1)$$
$$73.5 \text{ sq. in. occupied per tooth.}$$

$$\frac{1000 \text{ sq. in}}{73.5 \text{ sq. in./tooth}} = 13.6 \text{ teeth}/1000 \text{ sq. in. of surface plate } 42. \quad (2)$$

If the tooth density is less than about 10 teeth per 1000 sq. in., the dispersing wheel does not provide efficient break-up and dispersal of the bale. If the tooth density is greater than about 20 teeth per 1000 sq. in., the paper can tend to collect on outer surface plate 42 by becoming impacted between the teeth. Such build-up of paper reduces the effectiveness of the teeth in breaking up and dispersing the paper.

Figure 4:
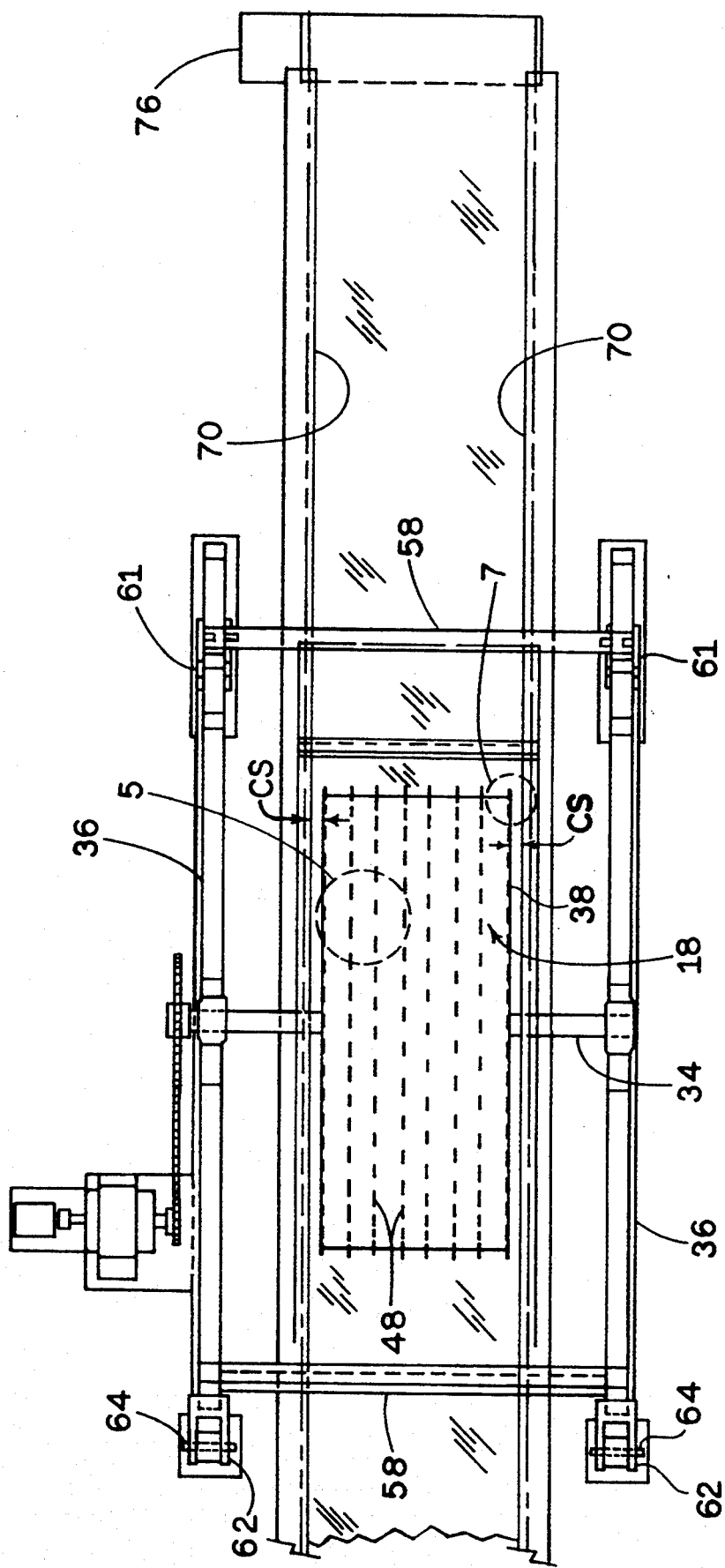
FIG. 4 is an enlarged top view of the dispersing wheel, and its drive system and frame.
Figure 5:
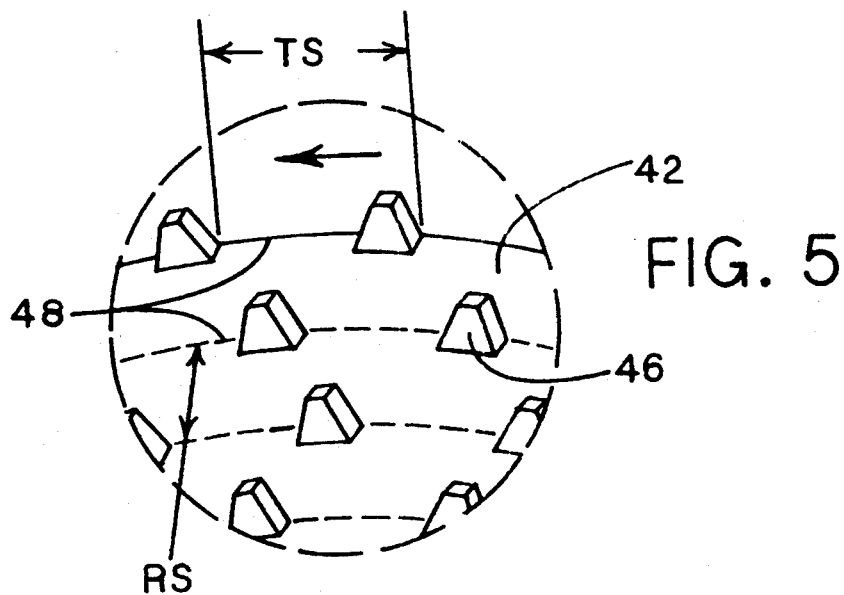
FIG. 5 is an enlarged pictorial view of a portion of the outer surface of the dispersing wheel, showing a number of the teeth, and taken at the dashed circle 5 in FIG. 4.
Figure 6:
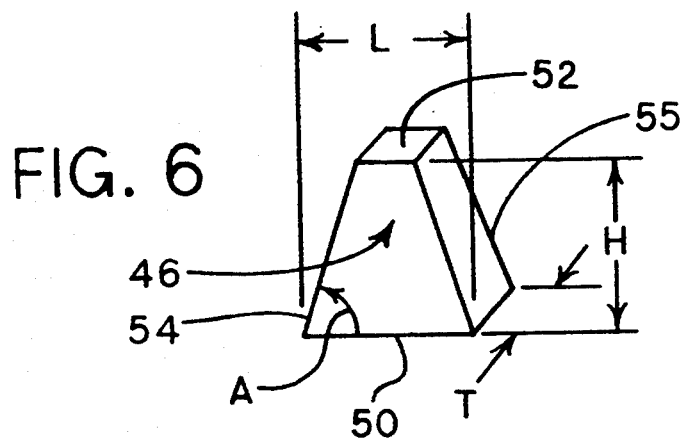
FIG. 6 is an enlarged pictorial view of one of the teeth.

FIGS. 4 and 5 illustrate the spacing of the teeth. FIG. 5 illustrates the general shape of the teeth. FIG. 6 illustrates one embodiment of the shape of the teeth.

In the illustrated embodiment, teeth 46 are preferably cut from ⅜ inch steel plate. Thus the thickness "T" of the tooth is ⅜ inch. Thicknesses of about ¼ inch to about ¾ inch are contemplated as being acceptable. Thinner teeth may cut the paper rather than dispersing it out of the bale. Teeth which are thicker than ¾ inch have less capacity to grippingly engage the paper.

The base 50 of the tooth has a length "L" of 3 inches, and is secured to outer surface plate 42, for example by welding. The height "H" of the tooth is 3 inches, extending from base 50 to the top 52 of the tooth. Top 52 of the tooth is generally ⅜ inch wide by 1 inch long. Leading edge 54 and trailing edge 55 generally extend from base 50 toward top 52, at an angle "A" of about 80 degrees with respect to the base 50. It is important that an effective portion of the leading edge 54 define an angle of no less than about 45 degrees with respect to base 50, in order that the teeth perform their gripping-type function of breaking up the bales and dispersing their elements on the conveyors.

Height "H" can be between about 2 and about 4 inches. Shorter teeth tend to grip the paper less efficiently. With longer teeth, the paper tends to become entangled in the teeth, and can become compacted between them.

As suggested in the drawings, the outermost rows of teeth 46 are generally in a plane coextensive with end plates 38 on opposing ends of the dispersing wheel. See FIG. 7.

Figure 7:
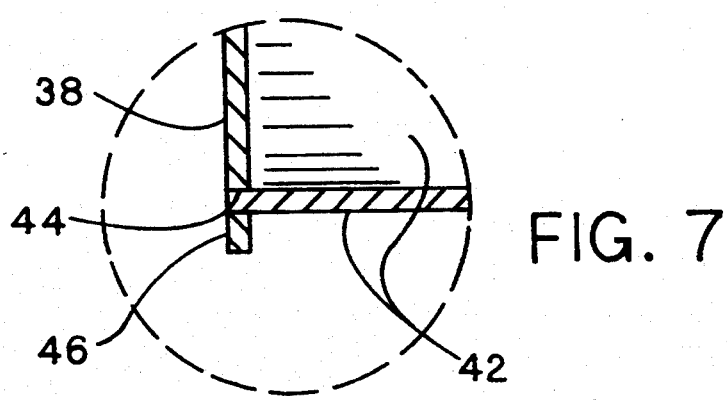
FIG. 7 is an enlarged fragmentary cross-section of a corner of the dispersing wheel, taken at the dashed circle 7 in FIG. 4.

As suggested by FIG. 7, outer surface plate 42 is secured to the end plates 38 at the outer edges 44 of the end plates 38. Also as suggested by FIG. 7, dispersing wheel 18 is hollow, and is traversed by shaft 34.

Dispersing wheel 18 rotates on shaft 34, about axis 37, in the direction opposite the direction of advance of conveyor 16, as shown by the arrows on end plate 38 and on conveyor 16 (FIG. 1). Dispersing wheel 18 is driven by motor 57 and suitable drive linkage such as chain 59 and sprockets 60.

Frame 13, which supports dispersing wheel 18, generally comprises the lateral support arms 36 adjacent opposing ends of dispersing wheel 18 and crossing arms 58. The support arms extend toward the front of dispersing wheel 18 to a first pair of upright supports 61 on opposing sides of conveyor 16 at a first end of the lateral support arms, and extend toward the rear of dispersing wheel 18 to a second pair of upright supports 62 at a second end of the lateral support arms. Upright supports 61 and 62 support dispersing wheel 18 from the floor or other like supporting surface. Lateral support arms 36 are mounted for pivotation with respect to the respective upright support 61 by a pivot shaft 64.

Upright supports 62 include upright slots 66. Slots 66 are, for example but not as limiting, about 2 inches wide, with an upward travel distance of about 6 inches. Mounting pins 68 extend from the second ends of lateral support arms 36 through slots 66.

The arrangement of slots 66 and mounting pins 68 thus allows the movement of mounting pins 68 in slots 66. Accordingly, dispersing wheel 18 can rise/move upwardly with respect to the underlying conveyors in accordance with the limited amount of travel permitted by slots 66. Thus, when dispersing wheel 18 encounters material (or an object) which the wheel cannot break up and disperse, as the material or object is forced under wheel 18 by conveyor 16, the dispersing wheel 18 can rise, with pressure being applied on the material or object by the weight of the wheel, the limited amount afforded by slots 66, to allow to pass objects which are somewhat larger than intended. This provides an overload release mechanism, such that larger chunks of material in the bales can traverse past the dispersing wheel without damage to the wheel, and without stopping the feeding operation to clear them. So long as the chunks are only modestly larger than planned, the pulping system can accommodate a modest quantity of them, and they pass. The size of chunks which can be passed by the overload mechanism is thus controlled by the length of slots 66.

If dispersing wheel 18 encounters a chunk of material and rides up in slots 66 without passing the chunk, or if the wheel otherwise encounters excess resistance, drive motor 57 is overloaded and stops in response to a standard overload sensor, not shown. A motion sensor, not shown, on shaft 34 senses stoppage of dispersing wheel 18, and sends a signal to controller 32, which stops conveyors 14 and 16, and sends an alert signal to the operator's station (not shown) at a location remote from the bale feeding system.

Both conveyors 14 and 16 are generally enclosed on their sides by retaining walls 70, which retain the material on the conveyors, at their sides. In addition, the retaining walls prevent the bales, and oversize chunks of paper from by-passing the dispersing wheel by going around dispersing wheel 18 along end plates 38.

Rather, dispersing wheel 18 is positioned over feed conveyor 16 in a blocking position, to prevent passage of chunks of material which extend higher than the clearance height "C" between the load transporting apron (or belt) 72 on conveyor 16 and the teeth 46 on dispersing wheel 18. Clearance height "C" can range between about 3 and about 36 inches. Preferred clearance is about 12 to about 24 inches. The clearance illustrated is 18 inches.

A limited clear space "CS" (FIG. 4) is provided between end plates 38 and retaining walls 70. The clear space must have a large enough minimum dimension at all locations between dispersing wheel 18 and retaining walls 70 that paper entering the clear space can get past dispersing wheel 18 without becoming impacted between the dispersing wheel 18 and the associated retaining wall 70. Correspondingly, the clear space should not allow oversize chunks to pass around the dispersing wheel. Thus, in general, the clear space "CS" should be at least 4 inches wide, preferably at least 6 inches wide, but generally will be no greater than 12 inches wide.

The feed system of the invention is operated as follows. The height of dispersing wheel 18 over the conveyor apron 72 is adjusted, using turnbuckle 25, to obtain the desired clearance "C," which is the specified operating clearance. The pulping unit 28 is prepared to receive raw material into hopper 22. The bale-feeding system 10 is electrically energized through controller 32. Weigh scale 20 is activated. Dispersing wheel 18 is started, such that it rotates as shown, in a direction opposed to the direction of travel of the conveyor aprons 72, 74. Conveyor drives 33 and 76 are energized, and conveyors 14 and 16 are started up, such that load transporting apron 72 of feed conveyor 16, and load transporting apron 74 of metering conveyor 14, are both advancing in the direction shown by the arrows, toward pulping unit 28. The dispersing wheel rotates, in the direction shown, at a surface speed (outer surface plate 42) of about 95–120 feet per minute.

Apron 74 advances bales to conveyor 16 at a rate sufficient to provide the output rate desired, as measured at scale 20. The speed of apron 74 varies depending on the space "S" between bales, and on the material output quantity sensed at scale 20. Apron 74 can stop when an adequate supply of material is at dispersing wheel 18. Thus, the speed of advance of apron 74 can readily change by greater than 30% in 30 seconds. In preferred embodiments, the speed of apron 74 can change from full stop to full drive speed (typically 30–80 feet per minute) in less than 5 seconds.

Apron 72 advances at a preferred;surface speed of about 10–12 feet per minute, feeding the bales to and against the dispersing wheel, where the bales are broken up and dispersed on apron 72. See FIG. 1. Thus, the dispersing wheel operates on material only on feed conveyor 16.

Surface speed of apron 72 typically operates within a range of about 6 to about 40 feet per minute with baled paper. The surface speed of apron 72 will, of course, depend in part on the size of the bales being fed into the system and on the desired output rate.

The speed of advance of apron 72 is rather steady, as compared to the more changeable speed on apron 74. Preferably, the speed of apron 72 does not change by more than 20% in any 30 second period. Rather, with the bale-feeding system operating at steady state, the speed of apron 72 generally remains constant.

Thus, the absolute feed rate is largely a function of the specific system. The ratio of the dispersing wheel speed to the speed of the conveyors is, however, relatively consistent from system to system, such that the interaction of the dispersing wheel with the conveyors is essentially the same from system to system.

Elements of the broken up bale, which are small enough to pass under dispersing wheel 18, proceed on apron 72, under dispersing wheel 18, and are discharged from feed conveyor 16 into hopper 22.

As a bale is advanced into dispersing wheel 18 by apron 72, the bale can tend to become wedged, or impacted, under wheel 18. In order to prevent a bale from becoming lodged under dispersing wheel 18, the surface speed of dispersing wheel 18 is at least 2 times as fast as the surface speed of apron 74 of feed conveyor 16. Improved bale break-up is obtained when the speed ratio is at least 6/1. At preferred speeds, the ratio of the speed of the dispersing wheel to the speed of apron 72 is about 10/1. At such speeds, the wheel tends to throw paper, which is broken from the bale, a short distance backwards on the conveyor, with resulting improved uniformity of dispersal of the paper along the conveyor.

In practice, the quantity of material approaching feed conveyor 16 on apron 74 varies with the size and density of the bales, and with the distribution of bales 24 on apron 74. Accordingly, apron 74 advances intermittently, and at varying speeds, in response to level detector apparatus positioned ahead of dispersing wheel 18, and above apron 74. If dispersing wheel 18 is encountering an excess quantity of material to process, apron 74 slows down or stops. If dispersing wheel 18 has little or no material to process, apron 74 speeds up.

Feed conveyor 16 transports the dispersed material, which passes under dispersing wheel 18, to hopper 22, and discharges the material into the hopper as shown. The weigh scale 20 senses the amount of material on apron 72, and as discussed above, adjusts the speed of advance of apron 72 so that the rate of feeding the material to hopper 22 corresponds with the desired rate. When controller 32 adjusts the speed of apron 72 on conveyor 16, it may also make a directly related adjustment of the speed of advance of apron 74, so that the rate at which material is being deposited on conveyor 16 is adjusted accordingly. The difference between the speeds of conveyors 14 and 16 varies, depending on the amount of material deposited at the receiving end of conveyor 16 relative to the rate of off-take (and thus the rate of feeding material to the pulping process) desired for conveyor 16. Those skilled in the art will be able to determine and control the appropriate relative speeds of aprons 74, 72 of conveyors 14 and 16.

Figure 8:
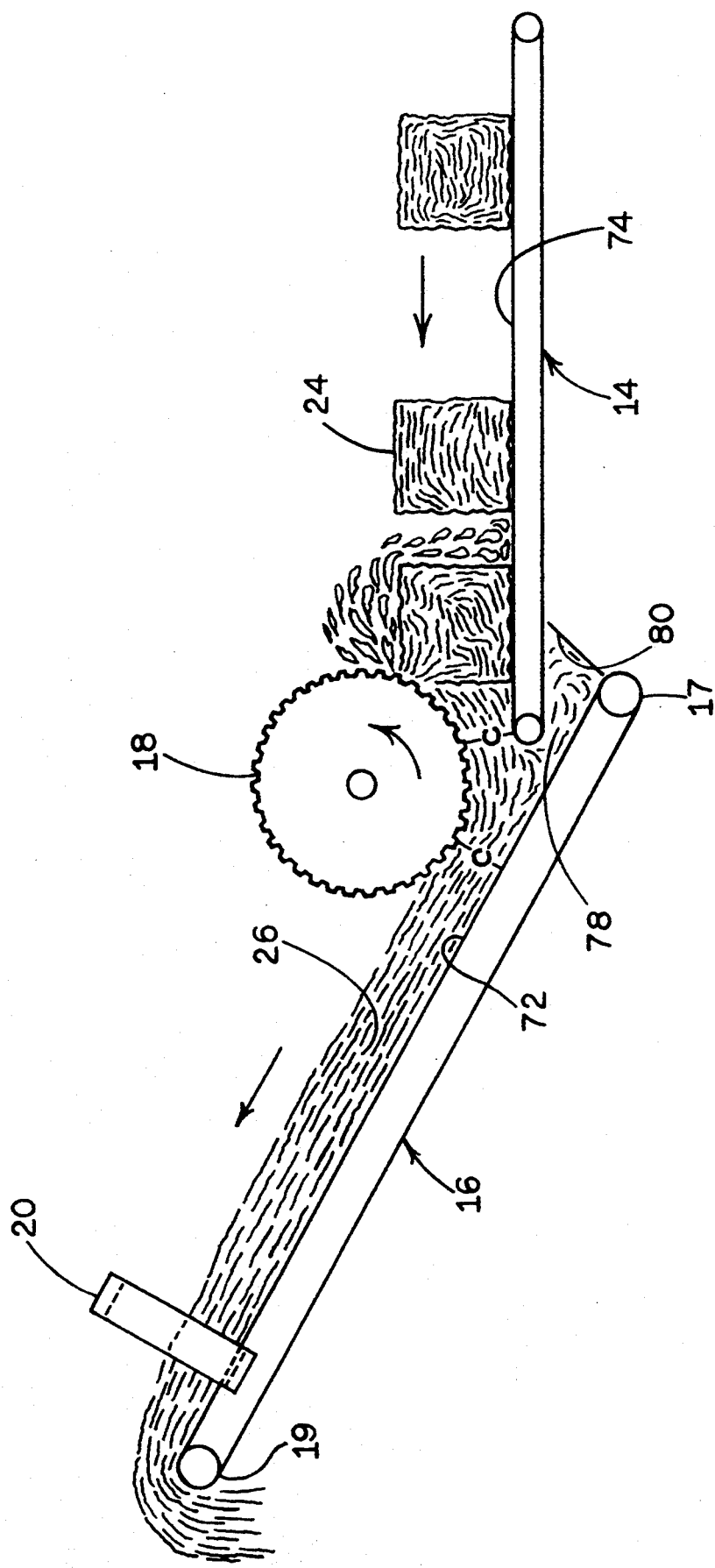
FIGS. 8 and 9 are side elevation views showing other embodiments of the feed system of the invention.

FIG. 8 illustrates a bale feeding system where the dispersing wheel 18 is located over the joint 78 whereat conveyor 14 transfers the load to conveyor 16. In this arrangement, the dispersing wheel breaks up and disperses the bales on conveyor 14; but is juxtaposed an approximately equal distance (clearance "C") from apron 72 of conveyor 16. Thus, after the material passes under dispersing wheel 18 on conveyor 14, and is deposited on conveyor 16, it passes under dispersing wheel 18 a second time, on conveyor 16, such that wheel 18 operates to generally level the material again on conveyor 16, and thereby to remove any thick spots in the layer 26.

So, in the embodiment of FIG. 8, wheel 18 acts like both a dispersing wheel, over conveyor 14, and a leveling wheel, over conveyor 16. An accumulator hopper 80 receives excess material passing through joint 78; and apron 72 carries that excess material back up conveyor 16 when the load of layer 26 is lighter.

Figure 9:
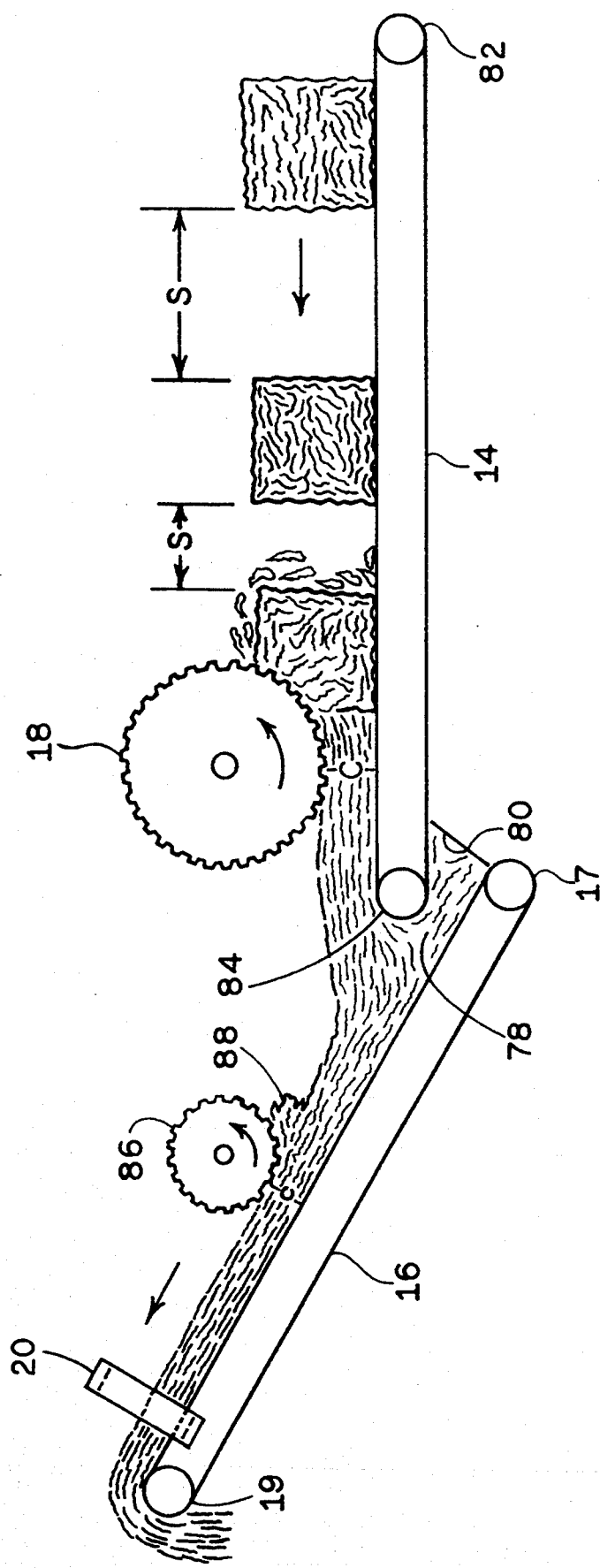

FIG. 9 illustrates a bale feeding system where the dispersing wheel 18 is located over metering conveyor 14, between its feed end 82 and its discharge end 84. In this embodiment, the dispersing wheel operates on material only on the metering conveyor 14, and the material is discharged from conveyor 14, without being simultaneously confined by wheel 18 overhead (as the material is confined in the embodiment of FIG. 8), onto conveyor 16 in the dispersed condition. Again, accumulator 80 is adapted to receive small amounts of excess material.

A leveling wheel 86 is disposed over, and entirely across, conveyor 16, and is disposed between the receiving end 17 of conveyor 16, and its discharge end 19. Leveling wheel 86, like dispersing wheel 18, is positioned the same distance "C" above the conveyor apron and rotates in a direction opposed to the direction of advance of the conveyors 16, 14. In this embodiment, the distance "C" is defined at the dispersing wheel, and is generally copied at the leveling wheel. Leveling wheel 86 is structured as a hollow cylinder, as is dispersing wheel 18, but is smaller in diameter than dispersing wheel 18, and is made with lighter weight material, for its less stressful leveling function.

The purpose of leveling wheel 86 is to level the high spots which are created in layer 26 during the transfer of the material from conveyor 14 to conveyor 16. Commonly, leveling wheel 86 will have, on the side disposed toward joint 78, a small tail 88 of material which has been pushed back off the top of layer 26. Material in tail 88 eventually works its way back under the leveling wheel 86, and to the discharge end 19 of conveyor 16. The net result of use of leveling wheel 86 is increased uniformity of the height and density of layer 26 as it passes through scale 20, and into hopper 22.

The discharge end 84 of metering conveyor 14 is disposed over, and proximate, the receiving end 17 of the feed conveyor 16. The space between conveyors 14 and 16, at their locus of closest approach (joint 78) is generally large enough to accommodate some paper falling through to hopper 80, so that hopper 80 serves as a surge supply of paper for filling in layer 26 for short periods of time.

Within the context of the invention, frames 12 and 13 are both considered to be part of the frame which supports the bale-feeding system 10.

A variety of types of load transporting members are known for use in conveyors, and are conventionally mounted in an endless loop arrangement. These include, for example, without being limited to, rubber belts and steel belts/aprons made from sections linked together for pivotation with respect to each other.

The "surface speed" of a given conveyor or load transporting member is the speed of advance of the load transporting member in its endless loop.

Layer 26 as referred to herein is comprised of clusters of paper which typically represent a plurality of sheets of paper originally incorporated into the bales. The individual clusters may be tightly packed together. The clusters are, however, usually loosely arranged with respect to each other. Accordingly, layer 26 is a rather loosely arranged accumulation of the clusters, and has a rather low volume density as compared to the density of the bale from which it was taken.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A method of dispersing bales of paper on a bale feed apparatus, said bale feed apparatus having a load transporting member, said method comprising the steps of:
   (a) mounting a dispersing wheel, having first and second ends, over and spaced from but proximate, said load transporting member, said dispersing wheel comprising (i) a pair of mounts adapted to mount said dispersing wheel for rotation about an axis of rotation, (ii) a pair of end plates, at respective ones of said first and second ends, secured to said mounts, and (iii) an outer surface plate extending between, and secured to, said end plates;

(b) providing retaining walls disposed at opposing ends of said dispersing wheel and positioned to prevent said bales from traveling around said dispersing wheel at said first and second ends of said dispersing wheel;

said dispersing wheel, in combination with said retaining walls, creating a blocking relationship to prevent bales from traveling under or around said dispersing wheel without being broken up and dispersed, (c) providing a clear space at least 4 inches wide at all locations between said end plates and said retaining walls;

(d) advancing said load transporting member at a first surface speed in a first direction;

(e) rotating said dispersing wheel at a second surface speed at least 2 times as fast as said first surface speed of said load transporting member, in a direction opposed to the direction of travel of said load transporting member; and (f) feeding bales of paper onto said bale feed apparatus and thus to said dispersing wheel;

whereby said bales of paper are broken up and dispersed on said load transporting member, by said dispersing wheel, the dispersed elements of paper passing under said dispersing wheel, and the dispersing of the paper by passage under said dispersing wheel is accompanied by controlled leakage of elements of paper around said dispersing wheel and through said clear space.

2. A method as in claim 1, said method comprising, in combination, selecting the diameter of said dispersing wheel and the spacing of said dispersing wheel from said load transporting member, in view of the dimensions of the bales to be acted upon by said dispersing wheel, such that the bales are confined to a location below the height of said axis of rotation of said dispersing wheel.

3. A method as in claim 1, said method comprising providing at least 6 inches of width of said clear spaces at both ends of said wheel.

4. A method as in claim 1 and including rotating said dispersing wheel at a surface speed at least 6 times as fast as the surface speed of said load transporting member.

5. A method as in claim 4 and including advancing said load transporting member at a speed of about 6 to about 40 feet per minute.

6. A method as in claim 1 and including rotating said dispersing wheel at a surface speed at least 10 times as fast as the surface speed of said load transporting member.

7. A method as in claim 6 and including advancing said load transporting member at a speed of about 6 to about 40 feet per minute.

8. A method as in claim 1 and including advancing said load transporting member at a speed of about 6 to about 40 feet per minute.

9. A method of feeding bales of paper to a processing unit, said method comprising the steps of:

(a) placing the bales onto a conveyor apparatus, said conveyor apparatus having first and second ends, and having a load transporting member traveling at a first surface speed in a first direction; and (b) dispersing said bales on said load transporting member, by (i) mounting a dispersing wheel over, and spaced from but proximate, said load transporting member, said dispersing wheel being in blocking relationship, with respect to said conveyor apparatus, to prevent said bales from traveling under or around said dispersing wheel without being broken up; and (ii) rotating said dispersing wheel at a second surface speed at least 2 times as fast as the first surface speed of said load transporting member, in a second direction opposed to the direction of advance of said load transporting member, whereby the combined and opposing movements of said load transporting member and said dispersing wheel, at said first and second surface speeds, cooperate with each other to break up the bales of paper into bale elements, as least as fast as the bales are advanced against said dispersing wheel, whereupon the bale elements pass under said dispersing wheel on said load transporting member and onward on said load transporting member toward said processing unit.

10. A method as in claim 9, and including feeding the bales of paper to said dispersing wheel on a metering conveyor having a first load transporting member and, after the bales have been broken up and the paper has been dispersed, on the metering conveyor, by the dispersing wheel, transferring the paper from said metering conveyor to a feed conveyor having a second load transporting member, and from said feed conveyor to the processing unit.

11. A method as in claim 10, and including changing the speed of advance of said first load transporting member by at least 30% in less than 30 seconds, to accommodate spacing of bales on said metering conveyor, thereby to deliver material to said feed conveyor at a relatively constant rate, and advancing said second load transporting member at a relatively constant rate, changing the speed of advance by no more than 20% in any 30 second period at operating conditions, whereby a relatively constant stream of paper is fed to said processing unit.

12. A method as in claim 9, said conveyor apparatus having first and second ends, and comprising a metering conveyor, having a first load transporting member, at said first end of said conveyor apparatus, said metering conveyor having first and second ends thereof, and a feed conveyor, having a second load transporting member, at said second end of said conveyor apparatus, said feed conveyor having first and second ends thereof, said metering conveyor and said feed conveyor being configured such that material is discharged from said metering conveyor onto said feed conveyor, and including feeding the bales of paper to said dispersing wheel on said metering conveyor, and including positioning said dispersing wheel over said metering conveyor between said first and second ends thereof, such that said dispersing wheel, by rotation thereof, operates on material only on said metering conveyor.

13. A method as in claim 9, said conveyor apparatus having first and second ends, and comprising a metering conveyor, having a first load transporting member, at said first end of said conveyor apparatus, said metering conveyor having first and second ends thereof, and a feed conveyor, having a second load transporting member, at said second end of said conveyor apparatus, said feed conveyor having first and second ends thereof, said metering conveyor and said feed conveyor being configured such that material is discharged from said metering conveyor onto said feed conveyor, and including feeding the bales of paper to said dispersing wheel on said metering conveyor, and including positioning a leveling wheel over said feed conveyor, between said first and second ends of said feed conveyor, such that said leveling wheel, by rotation thereof, operates to level material on said feed conveyor.

14. A method as in claim 9, said conveyor apparatus having first and second ends, and comprising a metering conveyor, having a first load transporting member, at said first end of said conveyor apparatus, said metering conveyor having first and second ends thereof, and a feed conveyor, having a second load transporting member, at said second end of said conveyor apparatus, said feed conveyor having first and second ends thereof, said metering conveyor and said feed conveyor being configured such that material is discharged from said metering conveyor onto said feed conveyor, and including feeding the bales of paper to said dispersing wheel on said metering conveyor, and including positioning said dispersing wheel over said feed conveyor between said first and second ends thereof, such that said dispersing wheel, by rotation thereof, operates on material only on said feed conveyor.

15. A method as in claim 9, said conveyor apparatus having first and second ends, and comprising a metering conveyor, having a first load transporting member, at said first end of said conveyor apparatus, said metering conveyor having first and second ends thereof, and a feed conveyor, having a second load transporting member, at said second end of said conveyor apparatus, said feed conveyor having first and second ends thereof, said metering conveyor and said feed conveyor being configured such that material is discharged from said metering conveyor onto said feed conveyor, and including feeding the bales of paper to said dispersing wheel on said metering conveyor, said metering conveyor having a first receiving end proximate said first end of said conveyor apparatus and a second discharge end proximate said feed conveyor, said feed conveyor having a first receiving end proximate said metering conveyor and a second discharge end proximate said second end of said conveyor apparatus, said discharge end of said metering conveyor being disposed proximately over said receiving end of said feed conveyor, whereby said first and second conveyors cooperatively form a joint therebetween whereat material is discharged from said metering conveyor onto said feed conveyor, and including positioning said dispersing wheel over said conveyor apparatus at said joint, such that said dispersing wheel, by rotation thereof, operates on material both on said metering conveyor and on said feed conveyor.

16. A method of feeding bales of paper, by means of a feed system, to a processing unit, said method comprising metering the amount of paper traversing said feed system, and breaking the bales into bale elements, including the steps of;
   (a) placing the bales onto a conveyor apparatus having first and second ends and load transporting apparatus, said conveyor apparatus being adapted
   (i) to receive bales of paper proximate said first end,
   (ii) to convey the bales through a metering process which breaks the bales into bale elements, and (iii) to deliver the bale elements to the processing unit proximate said second end of said conveyor apparatus, said conveyor apparatus comprising a metering conveyor, having a first load transporting member, at said first end of said conveyor apparatus, and a feed conveyor, having a second load transporting member, at said second end of said conveyor apparatus, said metering conveyor and said feed conveyor being configured such that material is discharged from said metering conveyor onto said feed conveyor, said metering conveyor having a first receiving end proximate said first end of said conveyor apparatus and a second discharge end proximate said feed conveyor, said feed conveyor having a first receiving end proximate said metering conveyor and a second discharge end proximate said second end of said conveyor apparatus;
   (b) positioning a dispersing wheel over said load transporting apparatus between said first and second ends of said load transporting apparatus;
   (c) advancing the bales against said dispersing wheel; and
   (d) rotating said dispersing wheel as the bales advance against said dispersing wheel whereby said dispersing wheel breaks up and disperses the bales on said conveyor apparatus, into bale elements, such that the bale elements pass under said dispersing wheel, on said conveyor apparatus, and advance toward said processing unit.

17. A method as in claim 16, and including positioning said dispersing wheel over said metering conveyor between said first and second ends thereof, such that said dispersing wheel, by rotation thereof, operates on material only on said metering conveyor.

18. A method as in claim 17, and including positioning a leveling wheel over said feed conveyor, between said first and second ends of said feed conveyor, such that said leveling wheel, by rotation thereof, operates to level material on said feed conveyor.

19. A method as in claim 16, and including positioning said dispersing wheel over said feed conveyor between said first and second ends thereof, such that said dispersing wheel, by rotation thereof, operates on material only on said feed conveyor.

20. A method as in claim 16, said discharge end of said metering conveyor being disposed proximately over said receiving end of said feed conveyor, whereby said first and second conveyors cooperatively form a joint therebetween whereat material is discharged from said metering conveyor onto said feed conveyor, and including positioning said dispersing wheel over said conveyor apparatus at said joint, such that said dispersing wheel, by rotation thereof, operates on material both on said metering conveyor and on said feed conveyor.

21. A method as in claim 16, and including positioning a leveling wheel over said feed conveyor, between said first and second ends of said feed conveyor, such that said leveling wheel, by rotation thereof, operates to level material on said feed conveyor.

22. A method of feeding bales of paper, by means of a feed system, to a processing unit, said method comprising metering the amount of paper traversing said feed system, and breaking the bales into bale elements, including the steps of;
   (a) placing the bales onto a conveyor apparatus having first and second ends and load transporting apparatus, said conveyor apparatus being adapted
   (i) to receive bales of paper proximate said first end, (ii) to convey the bales through a metering process which breaks the bales into bale elements, and (iii) to deliver the bale elements to the processing unit proximate said second end of said conveyor apparatus;

(b) positioning a dispersing wheel over said load transporting apparatus between said first and second ends thereof, whereby said dispersing wheel is disposed at a clearance height "C" from said load transporting apparatus;

(c) metering the amount of paper traversing said feed system by sensing the rate of flow of paper between said dispersing wheel and said second end of said conveyor apparatus and adjusting the clearance height "C," downwardly to decrease the rate of flow of paper to the processing apparatus, or upwardly to increase the rate of flow of paper to the processing apparatus;

(d) advancing one or more bales against said dispersing wheel;

(e) rotating said dispersing wheel as the bales advance against said dispersing wheel, whereby said dispersing wheel breaks up and disperses the bales on said conveyor apparatus, into bale elements, such that the bale elements pass under said dispersing wheel, on said conveyor apparatus, with the adjustment of the height of said dispersing wheel serving as at least partial control of the rate of delivery of paper to the processing unit.

* * * * *